Aug. 8, 1939.    J. A. STROTHER    2,168,457
POSTAGE METER COUNTER LOCK
Filed Aug. 1, 1936    2 Sheets-Sheet 1
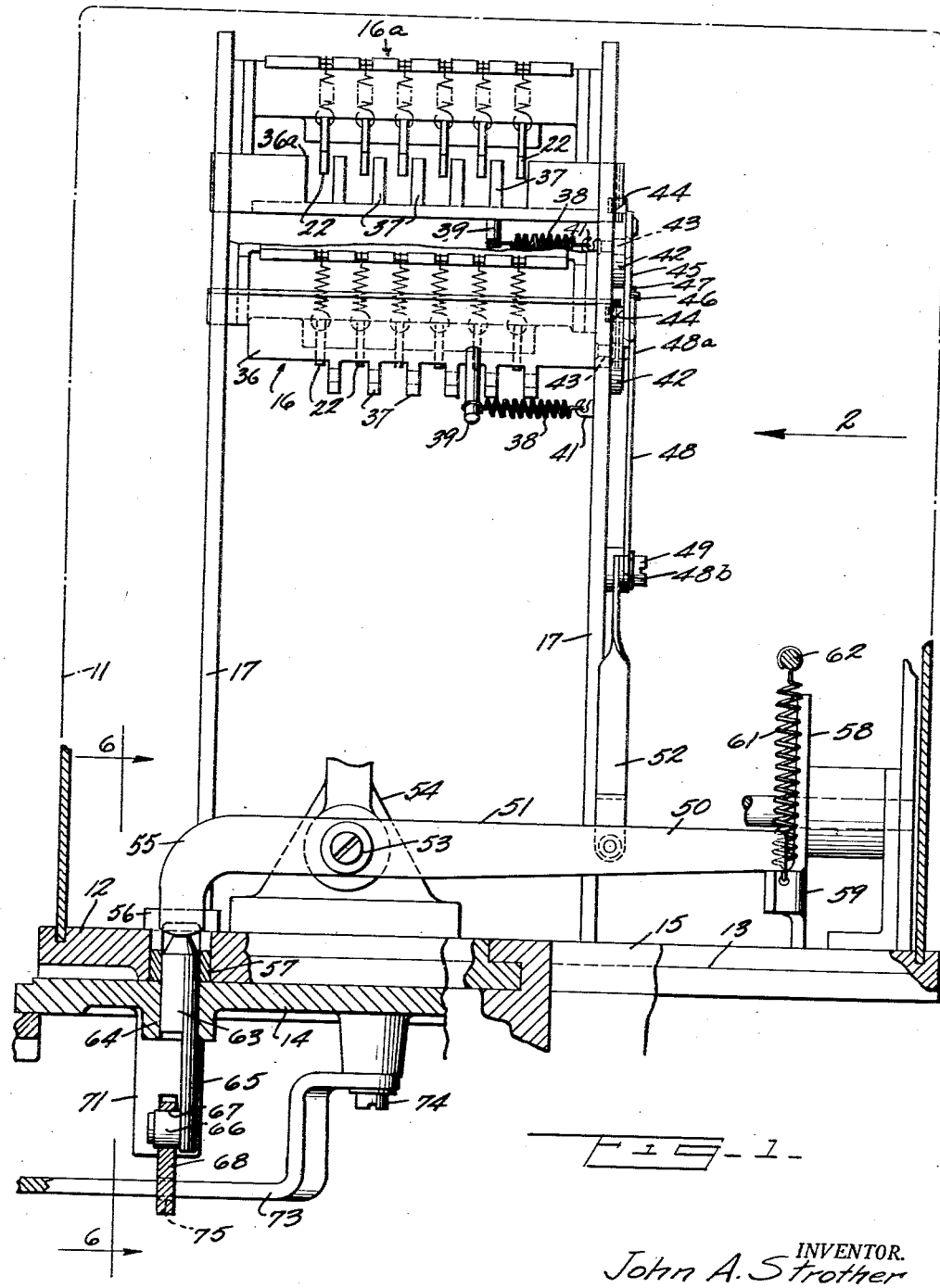

Aug. 8, 1939.  J. A. STROTHER  2,168,457
POSTAGE METER COUNTER LOCK
Filed Aug. 1, 1936  2 Sheets-Sheet 2
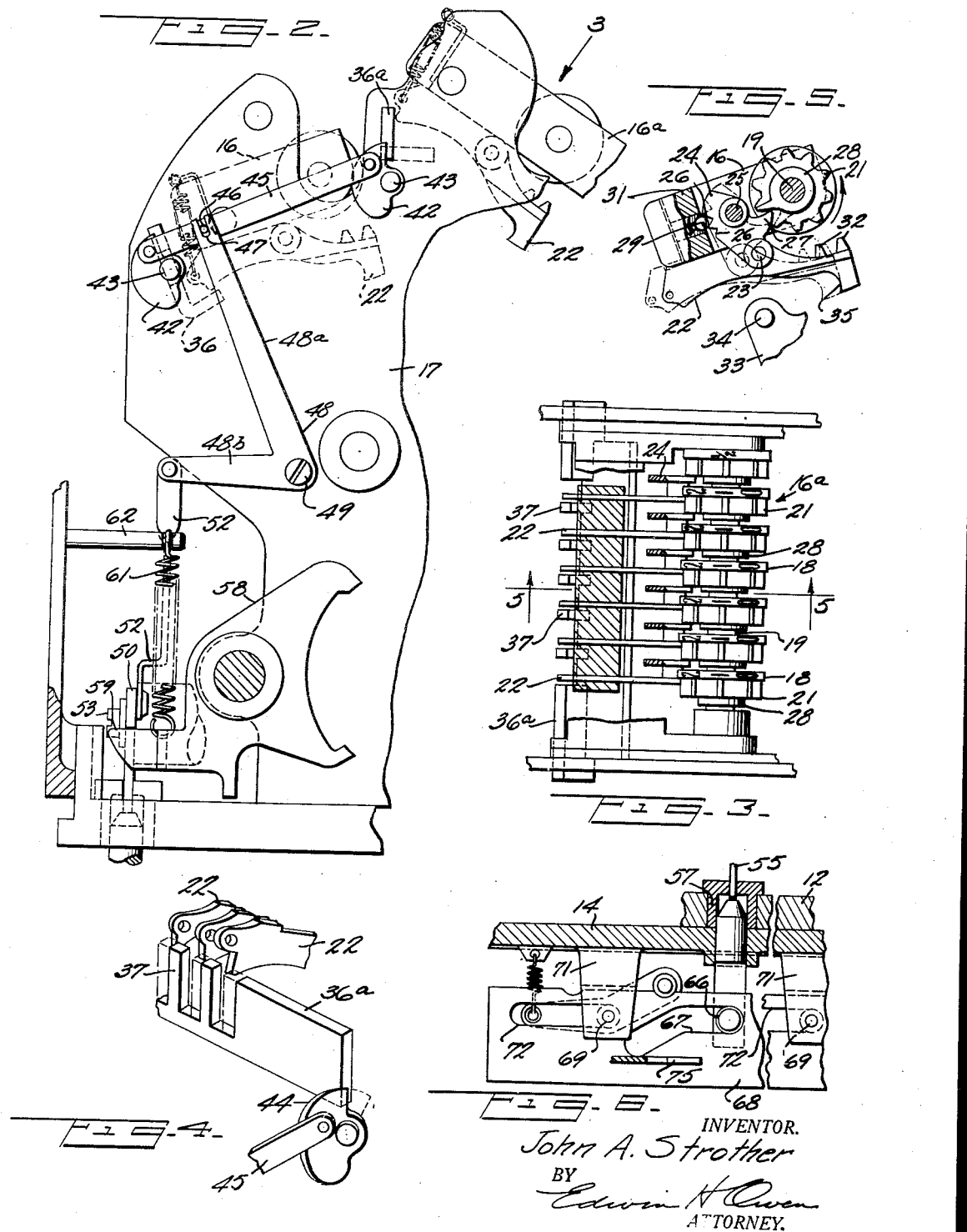
INVENTOR.
John A. Strother
BY
Edwin H. Owen
ATTORNEY.

Patented Aug. 8, 1939

2,168,457

UNITED STATES PATENT OFFICE 2,168,457

POSTAGE METER COUNTER LOCK

John A. Strother, Darien, Conn., assignor to Pitney-Bowes Postage Meter Co., Stamford, Conn., a corporation of Delaware Application August 1, 1936, Serial No. 93,797

3 Claims. (Cl. 235—130)

This invention relates to a totalizer or register mechanism in a detachable meter unit of a metered mailing machine and more particularly to a means for preventing the accidental tripping of tens transfer members, associated with said totalizer mechanism, after the meter unit is detached from the base.

The meter unit of a metered mailing machine, which includes a casing for the housing of the totalizers and the mechanism for actuating said totalizers, is made detachable for the purpose of permitting said unit to be taken to the post office for the setting of the subtracting totalizer by an authorized person, to the value of stamp impressions it is desired to purchase, also to permit same to be removed and stored away at the end of each day's operation.

Whenever the meter unit is removed from the machine, it is usually in the care of mail boys and is not always handled with care. Frequently the meters are subjected to rough handling, such as dropping them upon a bench or table and there have been cases where the meters have been accidentally dropped to the floor.

Under such conditions, it has been found that it was possible to trip the tens transfer members of the totalizer mechanism to a transfer position, then, upon placing the meter unit in the machine for the operation, the tripped transfer member or members would effect a transfer through the totalizer wheels of next higher order on the first operation of the machine and thereby cause a misregister in the meter unit.

It is the principal object of this invention therefore, to provide means to prevent movement of the tens transfer members of a totalizer in a meter unit of a metered mailing machine, when said meter unit is detached from the machine.

Another object is to provide an obstruction means which is adapted to be moved into the path of the tens transfer members upon removing the meter unit from the machine and which is adapted to assume a position which will permit the free movement of the transfer members when the meter is attached to the machine.

Another object is to control the position of the obstruction means through a manually actuated member, which member is adapted to be actuated to secure the meter unit to the machine and to release same.

With the above and other objects in view which will appear as the description proceeds the invention resides in the combination and arrangement of parts and in the details of construction hereinafter described and claimed, it being understood that various changes in the precise embodiment of the invention herein disclosed may be made within the scope of what is claimed without departing from the spirit of the invention.

A preferred embodiment of the invention is illustrated in the accompanying drawings wherein:

Fig. 1 is a part elevational and part sectional view showing a portion of a meter unit mounted upon a portion of the machine base and includes totalizers, tens transfer control or obstruction devices, also the means for controlling said obstruction devices;

Fig. 2 is a side elevational view taken in the direction of the arrow 2 of Fig. 1, with parts shown in section;

Fig. 3 is a plan view of a totalizer taken in the direction of the arrow 3 on Fig. 2, with parts broken away and parts shown in section;

Fig. 4 is a perspective view showing a fragmentary portion of the transfer members and a portion of the obstruction member, also a cam which is adapted to be actuated to move said obstruction member into the path of the transfer members;

Fig. 5 is a sectional view through a totalizer, taken on the line 5—5 of Fig. 3 and shows a transfer pawl and support in both a normal and a tripped position; and Fig. 6 is a part sectional and part elevational view taken along the line 6—6 of Fig. 1.

Referring to Fig. 1, the casing of a meter unit is indicated at 11 and is supported upon a support plate 12, which support plate has ways 13 provided along each of two sides thereof to permit the meter unit to be moved to an operating position upon the machine base structure, indicated at 14, by sliding same through suitable guides or gibs indicated at 15 on the machine base.

Two totalizers 16 and 16a are suitably supported between uprights 17, secured to the support plate 12, and comprise a series of totalizer wheels 18 which are freely rotatable upon a shaft 19. Each totalizer wheel 18 has a gear 21 secured thereto, which gears are adapted to be rotated in accordance with a value set up in a value printing device associated with a printing member in the meter unit.

Associated with each of said totalizer wheels are transfer members 22 which are pivotally supported upon individual studs 23, carried by pivotal links 24. Said links 24 are pivotally mounted upon a shaft 25 supported by the uprights 17 and have two notches 26—26 in one edge thereof as best shown in Fig. 5. At the opposite edge of each link there is a projecting tooth 27 which normally extend in the path of associated one toothed gears 28 and are adapted to be engaged by the tooth of said one toothed gears 28 once during each revolution of said gears 28 to thereby trip an associated transfer member 22 and place same in a position to effect a transfer in a totalizer wheel of next higher order during the next machine cycle of operation. By means of the engagement of the one tooth gear 28 with the tooth 27 of the link 24, said link 24 is rocked rearward to move the transfer member 22 to the dot and dash line position shown in Fig. 5. By means of spring pressed balls 29, which are suitably supported in a housing 31 and are adapted to engage the notches 26—26 in the links 24, the link 24 is maintained in either of two set positions.

When a transfer member 22 is set in the latter position, or the dot and dash line position of Fig. 5, it is in a transfer position and is adapted upon the next operation of the machine to be rocked about its pivot stud 23 to bring two teeth 32—32, on the transfer member 22, into engagement with a gear 21 of a counter wheel 18 of higher denomination. Next, said transfer member is adapted to be rocked forward to return the link 24 to its original or normal position and to simultaneously drive the gear 21 a distance sufficient to advance the counter wheel of higher denomination one step. The means for moving said transfer member 22 through a transfer operation comprises a rocker arm 33 having a pin 34 which is adapted to become engaged with a hooked end 35 of the transfer member 22 in a manner such as described in Patent No. 2,052,485.

The device according to this invention is particularly related to means for preventing the transfer member from being moved to a tripped position when the meter unit is removed from the machine. Said means comprises two comb members 36—36a each of which have a series of teeth 37 and are slidably mounted between the uprights 17. Said combs are further normally urged toward the right, according to the position as viewed from Fig. 1, by means of springs 38—38, which are stretched between pins 39, extending from the obstruction plates or combs 36, and pins 41 provided in one of the uprights 17. When in said latter position, which is the position the comb members will be in when the meter unit is mounted on the machine base, the spaces between the comb teeth are aligned with the transfer members to permit the free movement thereof.

Upon removing said meter unit from the machine base the comb members 36, 36a are adapted to be moved sideward to bring the tooth portions 37 directly behind the transfer members 22 to prevent the movement thereof.

Cooperating with said comb members, to move same to an obstructing or a non-obstructing position, is a device which comprises two cam members 42—42 which are pivotally mounted upon studs 43—43 and have angularly disposed cam faces 44 which are adapted to be moved into engagement with one end of each of said comb members, to force same inward against the pull of the springs 38—38. A link 45 joins said cam members 42—42 and has a pin 46 extending outwardly from one side thereof, which is engaged by a forked end 47 of one arm 48a of a bell crank 48. Said bell crank is pivotally mounted upon a stud 49, in one of the uprights 17 and has its other arm 48b joined with one arm 50 of a rocker member 51 by means of a link 52. Said rocker member 51 is pivotally mounted upon a stud 53, supported in a bracket 54, and has an oppositely disposed arm 55 which is bent downward and extends within a guide slot 56 in a bushing 57 inserted in the meter support plate 12. Also associated with said rocker member 51 is a rocker plate 58 which has a tail portion 59 normally engaging the lower surface of the arm 50, and is normally urged in an upward direction against said arm by means of a spring 61 stretched between said tail 59 and a pin 62 extending inward from one wall of the meter casing.

The above described structure is associated with the meter unit. The following structure, which cooperates with the above to move the obstruction combs 36—36a to an obstructing or nonobstructing position, is associated with the machine base.

Included with said latter structure is a meter locating pin 63 which is vertically slidable within a bearing 64 extending below the base 14 and is adapted to extend upwardly into the bushing 57 when the meter unit is properly located upon the base unit. A downward extension 65 on said pin 63 has a roller 66 rotatably mounted thereon which roller is adapted to extend through a cam slot 67 provided in a cam plate 68. Said cam plate 68 is slidably supported upon suitable studs 69—69 fixed within downwardly extending brackets 71—71 on the base member 14, said studs being guided within slots 72—72.

An operating arm or handle 73 has one end pivotally mounted upon a stud 74, secured in a boss extending below the base 14, and has its opposite end bent downwardly and outwardly through a slot 75 in the cam plate 68, also through a slot in the machine base (not shown). Said handle is arranged in a manner which will permit an operator to grasp the end thereof to shift same sideward and thereby shift said cam plate sideward. Through the roller 66 and cam slot 67, the pin 63 is thus adapted to be moved upward into engagement with the downturned arm 55 of the rocker member 51, when securing the meter unit to the base unit, or is adapted to be withdrawn when releasing the meter unit from the base unit.

From the positions shown in Figs. 1 and 6, it will be noted that when the handle 73 is moved toward the left, as viewed from Fig. 6, the cam plate 68 will be moved sideward to the left to cause the pin 63 to be moved upward into engagement with the arm 55 of the rocker member 51 to thereby rock said rocker member and cause the opposite arm 50 to draw the link 52 downward against the tension of the spring 61, which link will in turn rock the bell crank 48 to cause the cam members 42—42 to be moved out of a camming position with respect to the obstruction combs 36—36a.

When however, the meter unit is to be removed from the base unit, the operator shifts the handle 73 toward the right, as viewed in Fig. 6, to thereby withdraw the pin 63 downward from its engagement with the end 55 of the rocker member 51 to permit the withdrawal of the meter unit from the base unit. Through the pull exerted by the springs 61, the rocker member 51 will be rocked about the stud 53 in a counter clockwise direction and thereby cause an upward force to be exerted upon the link 52, which in turn will rock the bell crank 48 in a clockwise direction to thereby cause the cam members 42—42 to be rocked about their pivot studs 43—43 and cam the obstruction combs 36—36a inward to bring the teeth of said combs directly into the path of the ends of the transfer members 22—22.

It will thus be seen that after the meter unit is removed from the base unit, the obstruction comb members 36—36a will be simultaneously moved to a position which will prevent accidental operation of the transfer members if the meter unit should be subjected to any rough handling or should be dropped.

Having described the invention, I claim:

1. In a device of the class described having a base unit and a meter unit detachably mounted thereon, manipulative means to secure said meter unit to the base unit, registering mechanism in said meter unit including tens transfer members, obstruction means including comb members controlled by said manipulative means, and teeth on said comb members arranged to obstruct movement of the said tens transfer members when the meter unit is removed from the base.

2. In a device of the class described having a base, a meter unit detachably mounted on said base, registering mechanism in said meter unit including totalizer wheels having tens transfer members associated therewith, and a movable member having teeth adapted to obstruct movement of the transfer members while in one position and having tooth spaces to permit the free movement of the transfer members while in another position, and means to simultaneously adjust the position of said movable member with relation to the tens transfer members upon attaching or detaching the meter to and from the base.

3. In a device of the class described having a base, a meter unit detachably mounted on said base, means to secure said meter unit in an operating position on the base, registering mechanism in said meter unit including totalizer wheels having tens transfer members associated with the wheels of higher order and movable to an effective transfer position by a wheel of lower order, obstruction means having obstructing surfaces and controlled by said meter securing means to permit movement of the tens transfer members when the meter unit is secured to the base, and means effective to move the obstruction means to prevent the free movement of the transfer members when the meter unit is removed from the base.

JOHN A. STROTHER.